C. H. PELTON.
COUPLING.
APPLICATION FILED APR. 26, 1920.
1,383,017.
Patented June 28, 1921.
2 SHEETS—SHEET 1.
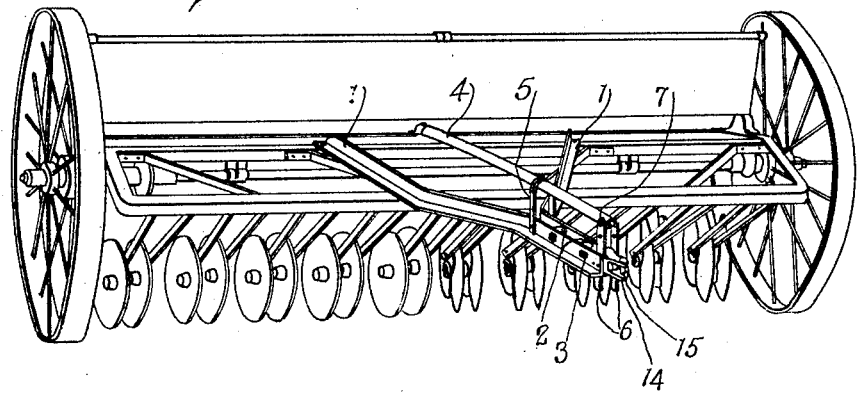
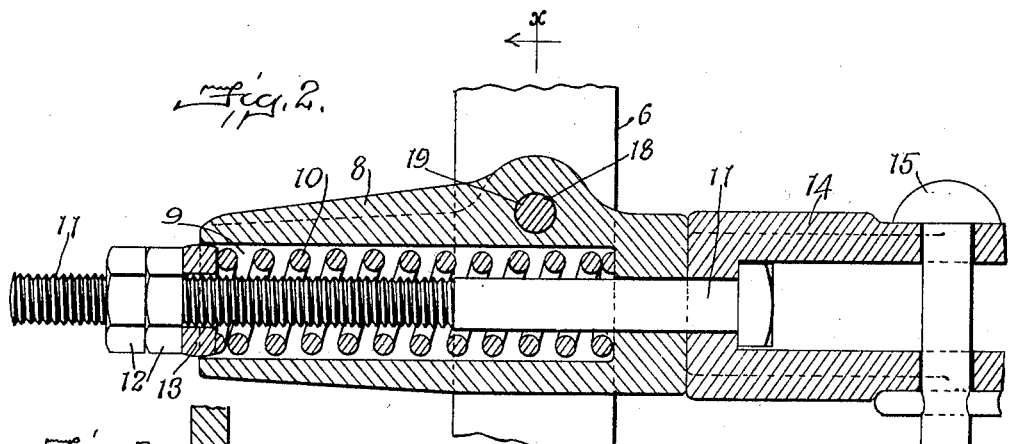
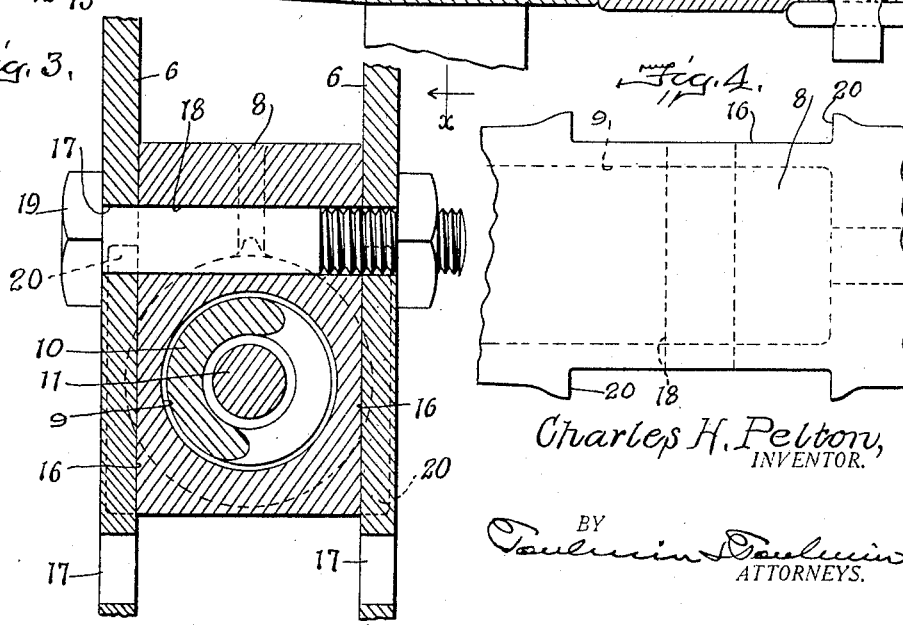
Charles H. Pelton,
INVENTOR.
BY
Toulmin Toulmin
ATTORNEYS.

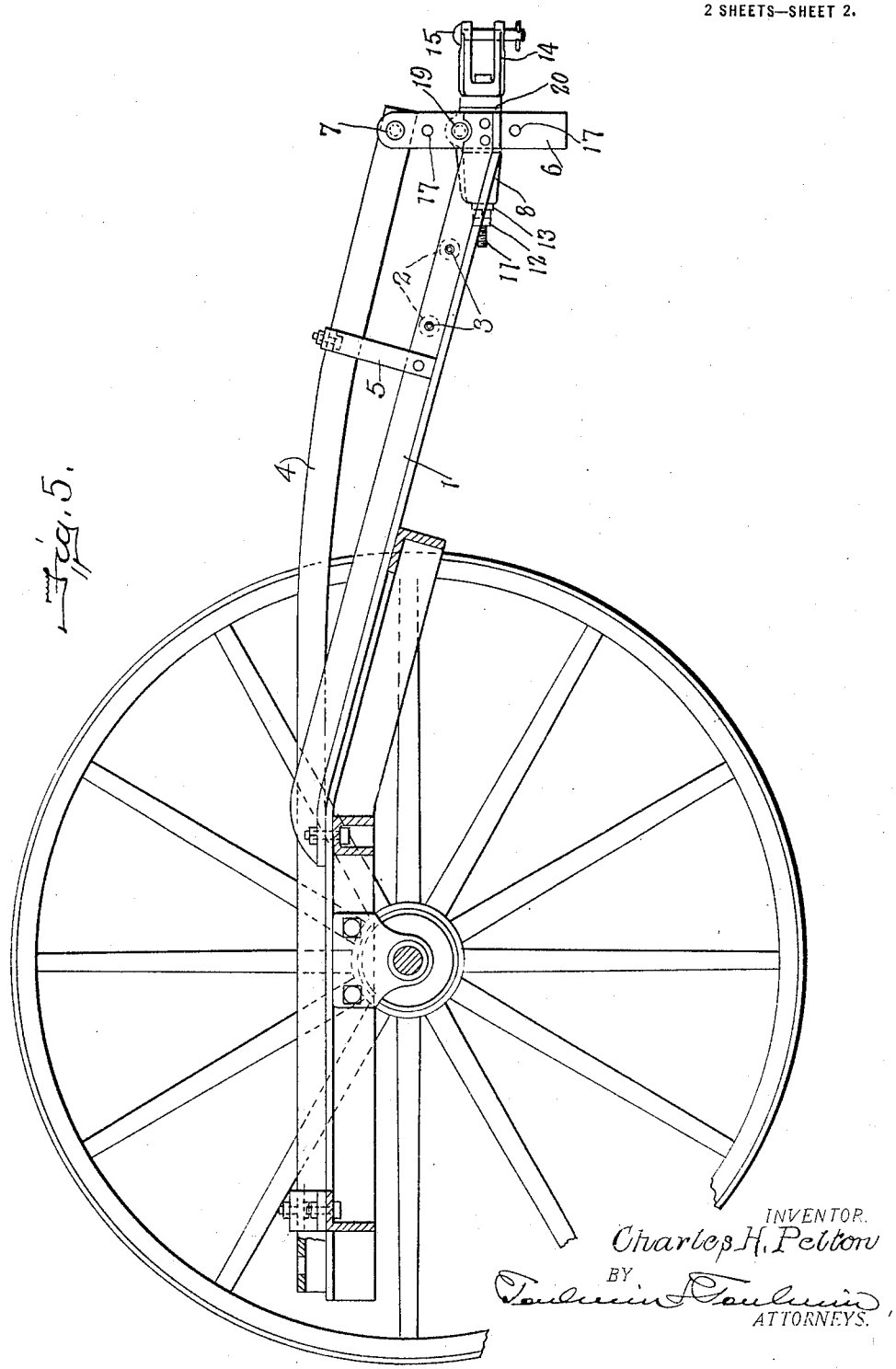

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

COUPLING.

1,383,017.  Specification of Letters Patent.  Patented June 28, 1921.

Application filed April 26, 1920. Serial No. 376,642.

*To all whom it may concern:*

Be it known that I, CHARLES H. PELTON, a citizen of the United States, residing at Springfield, in the county of Clark and State of Ohio, have invented certain new and useful Improvements in Couplings, of which the following is a specification, reference being had therein to the accompanying drawing.

This invention relates to improved couplings, having particular reference to couplings for farm implements, such as grain drills, cultivators, mowers, etc., whereby the same may be adapted to be drawn by a tractor.

The particular object of the invention is to provide a coupling of simple, durable construction which will withstand the heavy strains brought upon it incident to tractor operation of the implement, and which will be adjustable relative to its connection with the implement to effect regulation of the soil-engaging devices relative to the depth the same will enter the ground.

In the accompanying drawings:—

Figure 1 is a perspective view of a grain drill embodying my invention;

Fig. 2 is a longitudinal vertical section of the draw head and coöperating parts;

Fig. 3 is a transverse sectional view taken on the line x—x of Fig. 2;

Fig. 4 is a plan view of a portion of the draw head, particularly illustrating the shoulders and recesses; and Fig. 5 is a sectional view of the grain drill frame with my invention applied thereto in full lines.

In the drawings the draft frame members 1 are preferably formed of angle iron and may be attached to the main frame of the drill in any suitable manner, the usual construction consisting in bolting the draft-frame and main frame rigidly together so that the combined structure will be in effect a single frame.

As here shown the frame members 1 are suitably spaced apart at their forward extensions by spacing blocks 2 and are secured one to the other by bolts 3 which extend through the spacing blocks 2.

An upper bar or frame member 4, as shown, is used in connection with the frame 1, being connected thereto intermediate its ends by an arched bracket 5. Secured to the forward end of the draft frame,—to the inner faces of the opposite frame members 1, are two opposite, vertically disposed coupling plates 6, which are secured to the bar 4 by means of a bolt 7, the plates thus being made a fixed part of the draft-frame.

The draw-head, best shown in Fig. 2, consists of a body portion 8 which has a longitudinal aperture 9 formed therein, extending inwardly from the rear end thereof to receive a compression spring 10. A bolt 11 extends through the front end of the draw-head and the spring 10 and is engaged with the spring at its rear end by nuts 12 and retaining washer 13, the opposite end of the spring butting against the end wall of the draw-head. The forward, outwardly projecting end of the bolt 11 forms a journal for a swivel knuckle or clevis 14 having a coupling pin 15 whereby connection with the tractor is effected.

The draw-head 8 is provided with depressions 16 arranged vertically in the opposite side faces thereof and adapted to receive the respective plates 6 therein, thus forming a close fitting connection when the parts are assembled between the frames 1, as shown in Fig. 3.

The coupling adjusting plates 6 are provided with apertures 17 arranged at different elevations, and the draw-head is provided with an aperture 18 extending transversely therethrough and adapted to be brought into alinement with any two opposite apertures 17 in the plates 6; the parts being adapted to be secured in such relation by a clip-bolt 19.

From the foregoing detailed description it will be understood that the draw-head may be adjusted vertically relative to the plates 6, to the extent provided for in the length of the plates and the number of adjusting apertures provided therein, merely by changing the position of the slip-bolt. In all of said positions of vertical adjustment the draw-head will be held in engagement with the plates 6 by shoulders 20 formed at the opposite edges of the depressions 16. The spring 10 acts to give a degree of flexibility to the coupling and to some extent also as a shock absorber to relieve the drawn implement of the direct shocks transmitted through the coupling from the tractor.

Having thus fully described my invention, what I claim as new and desire to secure by Letters Patent, is:—

1. In a coupling, the combination, with a draft frame consisting of two opposite, forwardly-extending frame members, of opposite adjusting plates supported between said members, and a draft-head having a spring-mounted, longitudinally operable coupling connection supported therein and having depressions formed in the opposite side faces thereof, whereby said head may be mounted on said plates to have vertical adjustment relatively thereto.

2. In a coupling, opposed adjusting plates, a draft head mounted for vertical adjustment therebetween, and means adjustably engaged with the plates for drawing the latter together to rigidly clamp the draft head therebetween in various horizontal positions.

3. In a coupling, a vertically disposed support, a horizontally disposed draft-head mounted for adjustment in a vertical plane bodily on said support, means rigidly securing the draft-head in adjusted positions on the support, means for maintaining the draft-head in a horizontal plane during its movement from one position of adjustment to another position of adjustment, a coupling member, and an interposed yieldable shock absorbing device connecting the draft-head and coupling member.

4. In a coupling, a support, a draft head disposed angularly with respect to the support, means connecting said draft head to said support intermediate the ends of the draft head, a coupling member, and a yieldable shock absorbing connection between said draft head and coupling member.

5. In a coupling, a vertically disposed support, a horizontally disposed draft head, adjustable means rigidly mounting said draft head with respect to said support intermediate the ends of the draft head, a coupling member, and a yieldable shock absorbing connection between said draft head and the coupling member.

6. In a coupling, opposed frame members, opposed adjusting plates carried thereby, a superposed frame member secured to and constituting a spacing element for the adjusting plates, and a draft head mounted for vertical adjustment between said plates.

7. In a coupling, opposed vertically disposed adjusting plates, a horizontally disposed draft head mounted for sliding adjustment in a vertical plane bodily between said plates, means rigidly securing the draft head in adjusted position with respect to the plates, a horizontally movable coupling member, and a yieldable shock absorbing connection intermediate the draft head and coupling member.

In testimony whereof I affix my signature.

CHARLES H. PELTON.